(12) United States Patent
Kim et al.

(10) Patent No.: US 11,542,853 B1
(45) Date of Patent: Jan. 3, 2023

(54) COOLANT SUPPLYING MODULE

(71) Applicants: HYUNDAI MOTOR COMPANY, Seoul (KR); KIA CORPORATION, Seoul (KR); MYUNGHWA IND. CO., LTD., Seoul (KR)

(72) Inventors: Yeonho Kim, Seoul (KR); Jae Yeon Kim, Hwaseong-si (KR); Jeawan Kim, Gwangmyeong-si (KR); Dong June Kang, Incheon (KR); Yu Man Won, Suwon-si (KR)

(73) Assignees: HYUNDAI MOTOR COMPANY, Seoul (KR); KIA CORPORATION, Seoul (KR); MYUNGHWA IND. CO., LTD., Seoul (KR)

( * ) Notice: Subject to any disclaimer, the term of this patent is extended or adjusted under 35 U.S.C. 154(b) by 0 days.

(21) Appl. No.: 17/544,097

(22) Filed: Dec. 7, 2021

(30) Foreign Application Priority Data

Jun. 22, 2021 (KR) .......................... 10-2021-0080524

(51) Int. Cl.
*F01P 5/10* (2006.01)
*F01P 3/20* (2006.01)
*H01M 8/04029* (2016.01)

(52) U.S. Cl.
CPC ........... *F01P 3/20* (2013.01); *H01M 8/04029* (2013.01); *H01M 2250/20* (2013.01)

(58) Field of Classification Search
CPC .......... F01P 5/10; F01P 2005/105; F01P 5/12; F01P 2005/125; F01P 11/04; F01P 11/00; F01P 2070/10; F01P 5/00; F01P 2007/146; F01P 7/14; F01P 3/20; B60K 11/02; H01M 10/60; H01M 10/6567; H01M 10/66; H01M 10/56568
See application file for complete search history.

(56) References Cited

U.S. PATENT DOCUMENTS

| | | | |
|---|---|---|---|
| 2015/0217622 A1* | 8/2015 | Enomoto | B60H 1/00385 62/244 |
| 2016/0031291 A1* | 2/2016 | Enomoto | B60L 58/26 62/189 |
| 2017/0373359 A1* | 12/2017 | Krull | H01M 10/6567 |

FOREIGN PATENT DOCUMENTS

| | | | |
|---|---|---|---|
| CN | 212979863 U | * | 4/2021 |
| KR | 102179242 B1 | * | 11/2020 |
| KR | 20210027675 A | * | 3/2021 |

* cited by examiner

*Primary Examiner* — George C Jin
*Assistant Examiner* — Teuta B Holbrook
(74) *Attorney, Agent, or Firm* — McDonnell Boehnen Hulbert & Berghoff LLP (57) ABSTRACT

A coolant supply module includes a reservoir tank configured to store a coolant, a main body connected to the reservoir tank so that the coolant stored in the reservoir tank flows, at least one pump mounting portion formed in the main body so that at least one water pump is mounted, a valve mounting portion formed in the main body between the at least one pump mounting portion so that a valve device is mounted, and a controller mounted in the main body and electrically connected to the at least one water pump, wherein the main body includes a branch portion allowing a portion of a coolant introduced into one of the at least one pump mounting portion to flow into another pump mounting portion.

14 Claims, 7 Drawing Sheets

COOLANT SUPPLYING MODULE

CROSS-REFERENCE TO RELATED APPLICATION

This application claims priority to and the benefit of Korean Patent Application No. 10-2021-0080524 filed in the Korean Intellectual Property Office on Jun. 22, 2021, the entire contents of which are incorporated herein by reference.

BACKGROUND

(a) Field

The present disclosure relates to a coolant supply module, and more particularly, to a coolant supply module for smoothly supplying a coolant to an electric component cooling circuit for cooling a drive motor provided in a vehicle.

(b) Description of the Related Art

Recently, as interest in energy efficiency and environmental pollution issues has increased, eco-friendly vehicles that may substantially replace internal combustion engine vehicles are required to be developed. Such eco-friendly vehicles are generally classified into electric vehicles driven by fuel cells or electricity as power sources and hybrid vehicles driven using an engine and an electric battery.

Here, in the case of an electric vehicle using a fuel cell, a driving force is generated by converting chemical reaction energy of oxygen and hydrogen into electrical energy- and in this process, thermal energy occurs by a chemical reaction in the fuel cell, and thus, it is essential to effectively remove the heat to secure the performance of the fuel cell.

In addition, in a hybrid vehicle, along with an engine operating with a general fuel, a motor is driven using electricity supplied from the fuel cell or electric battery to generate driving force, and the performance of the motor may be secured by effectively removing heat occurring from the fuel cell or battery and the motor.

These hybrid vehicles run in an EV mode driven by a motor during constant speed driving, gentle driving, and low and medium constant speed driving. During acceleration and rapid acceleration, an internal combustion engine and the motor are driven simultaneously, and during high-speed constant speed driving, the motor is stopped and the internal combustion engine may operate.

Accordingly, the hybrid vehicle is provided with an engine cooling circuit for cooling by circulating a coolant in the engine and an electric component cooling circuit for cooling by circulating a coolant in an electric power component including a motor.

Meanwhile, an electric vehicle includes an electric vehicle cooling circuit and a battery cooling circuit for cooling by circulating a coolant in an electric component including a drive motor and a battery.

However, in the electric vehicle of the related art as described above, a water pump for circulating a coolant should be provided in each drive motor provided on front and rear wheels in the electric component cooling circuit, so it is difficult to secure a mounting space in a narrow space and a layout constraint occurs.

In addition, as an installation time for mounting each water pump in a narrow space increases, productivity is lowered, and mountability is lowered when each water pump is mounted.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a coolant supply module having advantages of smoothly supplying a coolant from one reservoir tank to an electric component cooling circuit for cooling each drive motor provided to correspond to front and rear wheels of a vehicle.

An exemplary embodiment of the present disclosure provides a coolant supply module including a reservoir tank configured to store a coolant, a main body connected to the reservoir tank so that the coolant stored in the reservoir tank flows, at least one pump mounting portion formed in the main body so that at least one water pump is mounted, a valve mounting portion formed in the main body between the at least one pump mounting portion so that a valve device is mounted, and a controller mounted in the main body and electrically connected to the at least one water pump, wherein the main body includes a branch portion allowing a portion of a coolant introduced into one of the at least one pump mounting portion to flow into another pump mounting portion.

The main body may further include a tank connection portion communicating with an inside through the valve mounting portion and allowing the reservoir tank to be mounted thereon.

A connection hole may be formed to correspond to the tank connection portion below the reservoir tank.

The at least one pump mounting portion may include a first pump mounting portion formed on one side of the main body, and a second pump mounting portion formed on the other side of the main body to correspond to the first pump mounting portion and configured to communicate with the branch portion.

A first water pump having a first port may be mounted on the first pump mounting portion.

A branch port to be mounted on the branch portion may be formed at the first port A second water pump having a second port may be mounted on the second pump mounting portion.

The branch portion may have one end integrally connected to the second pump mounting portion and the other end disposed in a position spaced apart from the first pump mounting portion to correspond to the branch port so that the branch port is mounted.

The first pump mounting portion may be disposed in a position facing the second pump mounting portion, and the first pump mounting portion and the second pump mounting portion are positioned on the same line on both sides of the main body.

The controller may include a connection connector formed in a position corresponding to the at least one water pump and connected to the at least one water pump.

The connection connector may be bent from the controller toward the at least one pump mounting portion.

At least one cooling fan may be mounted on the controller to prevent the controller from being overheated.

A connector connection portion may be formed in the controller so that a control signal is selectively applied.

The main body may further include a bypass port communicating with the valve mounting portion therein.

As described above, according to the coolant supply module of the exemplary embodiment of the present disclosure, a coolant may be smoothly supplied from one reservoir tank to an electric component cooling circuit for cooling drive motors respectively provided to correspond to the front and rear wheels of a vehicle and a pipe connection is facilitated, and thus, the space utilization in a narrow space may be improved.

In addition, in the present disclosure, water pumps for supplying a coolant to an electric component cooling circuit provided for cooling each drive motor and a reservoir tank are integrally configured, so that the overall number of components may be reduced and packaging may be promoted.

In addition, in the present disclosure, a layout of connection pipes may be simplified and mountability and maintainability may be improved.

Furthermore, in the present disclosure, the use of separate components for connecting respective pipes may be minimized, thereby promoting weight and cost reduction and reducing the assembly process to improve productivity.

DETAILED DESCRIPTION

Hereinafter, an exemplary embodiment of the present disclosure will be described in detail with reference to the accompanying drawings.

The exemplary embodiments described in the present disclosure and the configuration illustrated in the drawings are merely the most preferred embodiment of the present disclosure, rather than representing all the technical concepts of the present disclosure, so the present disclosure is meant to cover all modifications, similarities and alternatives which are included in the spirit and scope of the present disclosure at the time of filing of the present disclosure.

In order to clarify the present disclosure, parts irrespective of description will be omitted, and similar reference numerals are used for the similar parts throughout the specification.

In the drawings, sizes and thickness of components are arbitrarily shown for the description purposes, so the present disclosure is not limited to the illustrations of the drawings and thicknesses are exaggerated to clearly express various parts and regions.

Throughout the specification, unless explicitly described to the contrary, the word "comprise" and variations such as "comprises" or "comprising", will be understood to imply the inclusion of stated elements but not the exclusion of any other elements.

The terms "unit", "means", "part", "member", and the like, described in the specification refer to units of comprehensive configuration performing at least one function or operation.

Figure 1:
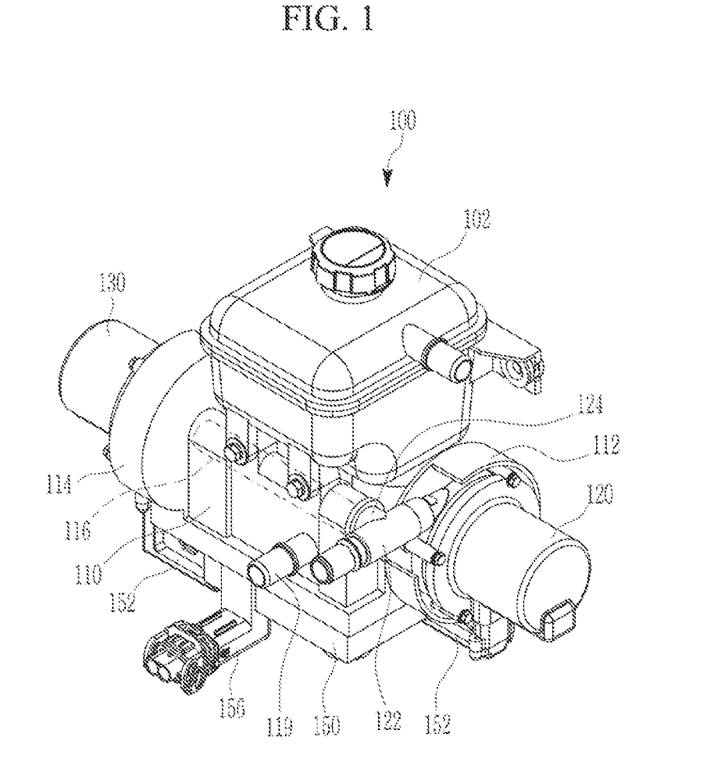
FIG. 1 is a front perspective view of a coolant supply module according to an exemplary embodiment of the present disclosure.
Figure 2:
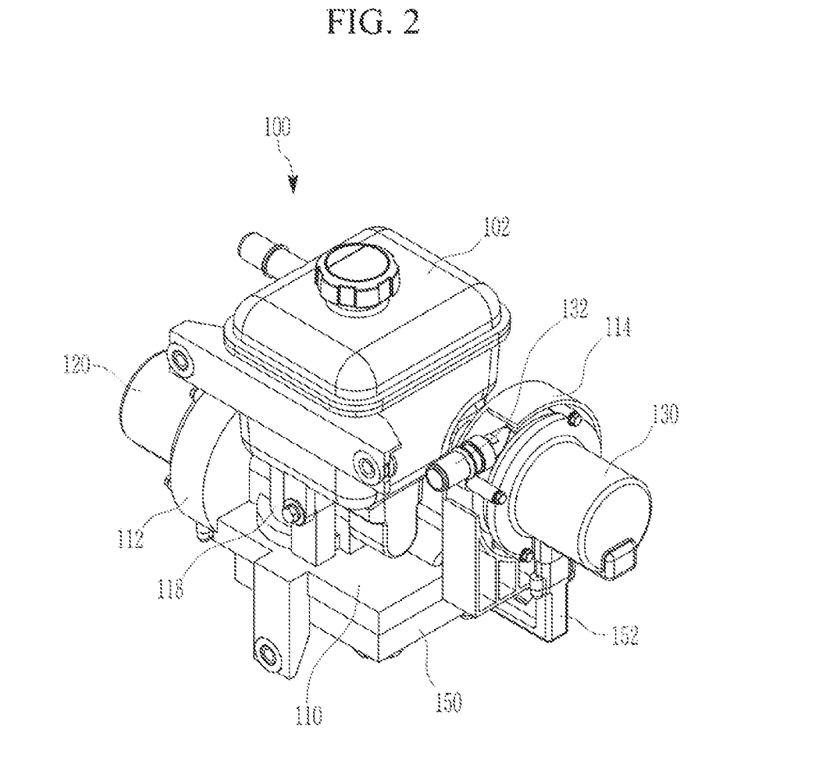
FIG. 2 is a rear perspective view of a coolant supply module according to an exemplary embodiment of the present disclosure.
Figure 3:
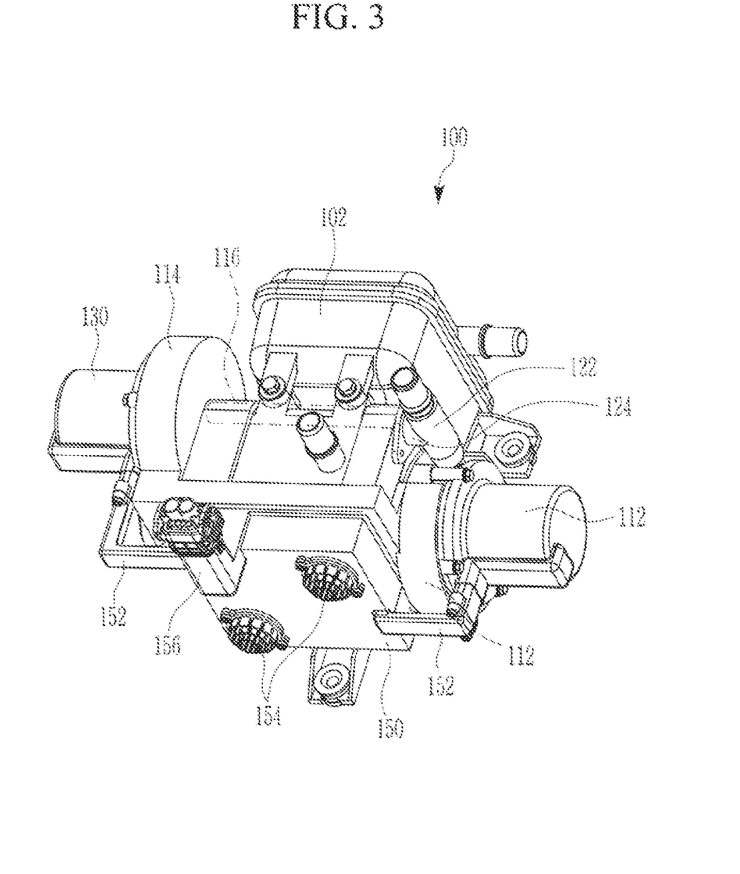
FIG. 3 is a rear-bottom perspective view of a coolant supply module according to an exemplary embodiment of the present disclosure.
Figure 4:
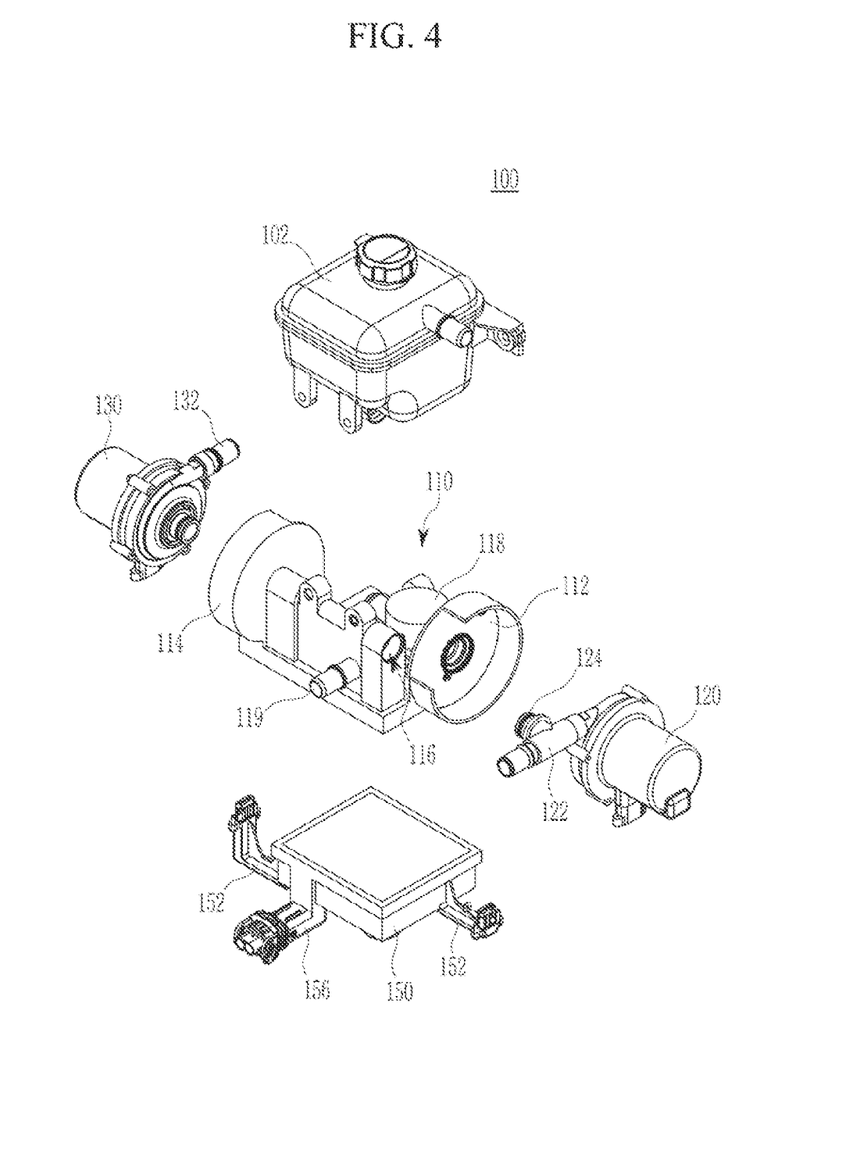
FIG. 4 is an exploded perspective view of a coolant supply module according to an exemplary embodiment of the present disclosure.
Figure 5:
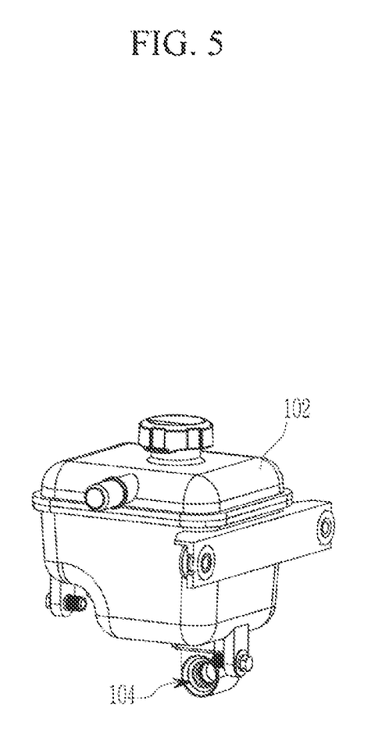
FIG. 5 is a perspective view of a reservoir tank applied to a coolant supply module according to an exemplary embodiment of the present disclosure.
Figure 6:
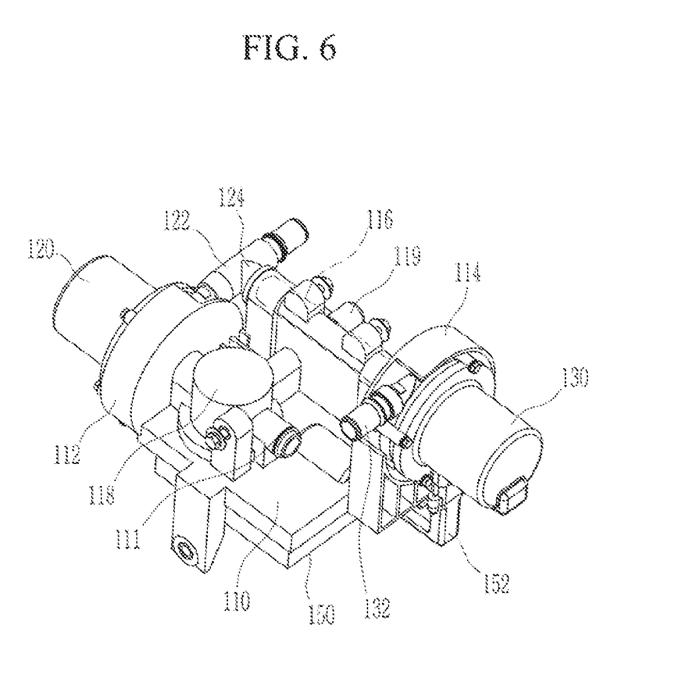
FIG. 6 is a view illustrating a coupled state of a main body and a controller applied to a coolant supply module according to an exemplary embodiment of the present disclosure.
Figure 7:
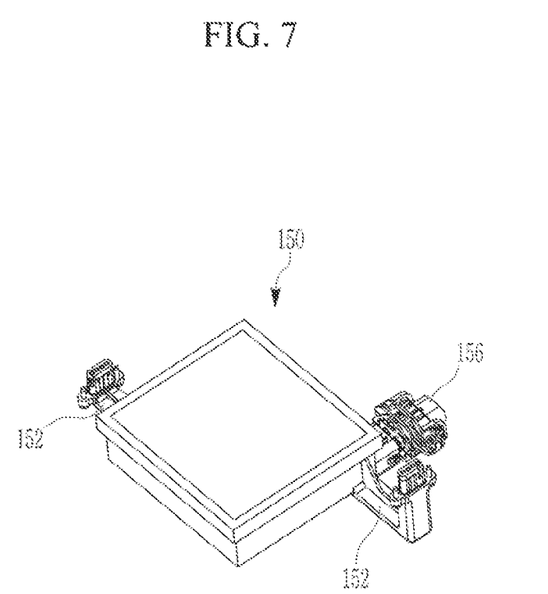
FIG. 7 is a perspective view of a controller applied to a coolant supply module according to an exemplary embodiment of the present disclosure.

FIG. 1 is a front perspective view of a coolant supply module according to an exemplary embodiment of the present disclosure, FIG. 2 is a rear perspective view of a coolant supply module according to an exemplary embodiment of the present disclosure, FIG. 3 is a rear-bottom perspective view of a coolant supply module according to an exemplary embodiment of the present disclosure, FIG. 4 is an exploded perspective view of a coolant supply module according to an exemplary embodiment of the present disclosure. FIG. 5 is a perspective view of a reservoir tank applied to a coolant supply module according to an exemplary embodiment of the present disclosure, FIG. 6 is a view illustrating a coupled state of a main body and a controller applied to a coolant supply module according to an exemplary embodiment of the present disclosure, and FIG. 7 is a perspective view of a controller applied to a coolant supply module according to an exemplary embodiment of the present disclosure.

Referring to the drawings, a coolant supply module 100 according to an exemplary embodiment of the present disclosure is applied to supply a coolant stored in one reservoir tank 102 to an electric component cooling circuit (not shown) for cooling each drive motor provided to correspond to front and rear wheels of a vehicle.

That is, the coolant supply module 100 may supply the coolant stored in the reservoir tank 102 to the electric component cooling circuit (not shown) to cool the drive motors respectively provided in the front and rear wheels.

As shown in FIGS. t to 7, the coolant supply module 100 includes the reservoir tank 102, a main body 110, at least one pump mounting portion, a branch portion 116, a valve mounting portion 118, and a controller 150.

Here, the at least one pump mounting portion and the valve mounting portion 118 may be integrally formed with the main body 110.

First, the coolant is stored in the reservoir tank 102. The coolant stored in the reservoir tank 102 may circulate in the electric component cooling circuit to cool a drive motor and electric components so as not to be overheated, and may be cooled through heat exchange with ambient air, while passing through a radiator (not shown).

In the present exemplary embodiment, the main body 110 is connected to the reservoir tank 102 disposed thereabove so that the coolant stored in the reservoir tank 102 flows. A space (not shown) may be formed inside the main body 110 so that the coolant flows.

In addition, the main body 110 may further include a tank connection portion 111 communicating with the inside through the valve mounting portion 118 and allowing the reservoir tank 102 to be mounted thereon (see FIG. 6).

Here, a connection hole 104 may be formed in a lower portion of the reservoir tank 102 to correspond to the tank connection portion 111 (refer to FIG. 5).

That is, the tank connection portion 111 may be inserted into the connection hole 104 formed in the reservoir tank 102 to interconnect the reservoir tank 102 and the main body 110.

Here, a sealing ring (not shown) for preventing the coolant stored in the reservoir tank 102 from leaking to the outside of the main body 110 may be mounted between the connection hole 104 and the tank connection portion 111.

That is, the sealing ring (not shown) seals a portion between an inner circumferential surface of the connection hole 104 and an outer circumferential surface of the tank connection portion 111, to prevent the coolant from leaking to the outside of the main body 110 along the outer circumferential surface of the tank connection portion 111.

In the present exemplary embodiment, the at least one pump mounting portion may be formed at the main body 110 so that first and second water pumps 120 and 130 included in the electric component cooling circuit are mounted to cool each drive motor provided to correspond to the front and rear wheels of the vehicle.

Here, the at least one pump mounting portion may include first and second pump mounting portions 112 and 114.

First, the first pump mounting portion 112 is formed on one side of the main body 110. The first water pump 120 having a first port 122 may be mounted on the first pump mounting portion 112.

The second pump mounting portion 114 may be formed on the other side of the main body 110 to correspond to the first pump mounting portion 112, and may communicate with the branch portion 116.

The second water pump 130 including a second port 132 is mounted on the second pump mounting portion 114.

Here, the first pump mounting portion 114 is disposed in a position opposite to the second pump mounting portion 116 and may be located on the same line on both sides of the main body 110.

Meanwhile, the first port 122 protrudes toward the outside of the main body 110 in a direction opposite to the second port 132.

That is, the first port 122 and the second port 132 may protrude from the main body 110 in opposite directions, respectively.

The first port 122 and the second port 132 may be connected to the electric component cooling circuit through a connection pipe.

In the present exemplary embodiment, the branch portion 116 may allow a portion of the coolant, introduced into the first pump mounting portion 112, to flow into the second pump mounting portion 114.

Here, a branch port 124 may be formed in the first port 122 so as to be mounted on the branch portion 116.

Meanwhile, one end of the branch portion 116 is integrally connected with the second pump mounting portion 114. The other end of the branch portion 116 may be disposed in a position spaced apart from the first pump mounting portion 112 to correspond to the branch port 124 so that the branch port 124 is mounted.

Accordingly, the coolant flowing from the reservoir tank 102 to the first pump mounting portion 112 through the inside of the main body 110 is discharged to the first port 122 according to an operation of the first water pump 120.

Here, a portion of the coolant discharged to the first port 122 is introduced into the branch portion 116 through the branch port 124. The coolant introduced into the branch portion 116 may flow to the second pump mounting portion 114 and may be discharged to the second port 132 according to an operation of the second water pump 130.

In this exemplary embodiment, the valve mounting portion 118 is formed in the main body 110 between the first pump mounting portion 112 and the second pump mounting portion 114 so that a valve device (not shown) is mounted.

Here, the valve device mounted on the valve mounting portion 118 may control a flow path of the coolant flowing in from the reservoir tank 102 or the coolant directly flowing in from the electric component cooling circuit.

Meanwhile, the main body 110 may further include a bypass port 119 communicating with the valve mounting portion 118 therein (see FIG. 6).

The bypass port 119 may allow the coolant, passing through the electric component, while circulating in the electric component cooling circuit, to directly flow into the main body 110, without passing through a radiator.

That is, the bypass port 119 may be selectively opened or closed according to an operation of the valve device when waste heat is recovered from the electric component in a heating mode of the vehicle or a warm-up of the electric component is required.

Also, as shown in FIGS. 4 and 7, the controller 150 is mounted at a lower portion of the main body 110 in which the reservoir tank 102 is mounted at an upper portion. The controller 120 may be electrically connected to the first and second water pumps 120 and 130 mounted on the main body 110 and control operations of the first and second water pumps 120 and 130.

Here, a printed circuit board (PCB) may be provided inside the controller 150. The PCB may be electrically connected to the first and second water pumps 120 and 130 and the valve device to control the operations of the first and second water pumps 120 and 130 and the valve device.

As shown in FIGS. 3, 6, and 7, the controller 150 may include connection connectors 152 formed in positions respectively corresponding to the first and second water pumps 120 and 130 and electrically connected to the first and second water pumps 120 and 130.

The connection connector 152 may be bent from the controller 150 toward the first and second water pumps 120 and 130.

That is, the controller 150 may be directly connected to the first and second water pumps 120 and 130 through the connection connectors 152 without a separate electric wiring.

Meanwhile, the controller 150 may be equipped with a cooling fan 154 for cooling the PCB provided therein to prevent the PCB from being overheated during an operation of the controller 150.

In addition, a connector connection portion 156 may be formed in the controller 150 to selectively apply a control signal to the PCB.

The connector connection unit 156 may be connected to an electric wire or cable connected to a controller provided in the vehicle.

That is, the controller 150 may be simply connected to the first and second water pumps 14 and 24 through the connection connectors 152, and at the same time, may be mounted on the main body 110 through a minimal assembly process.

In the coolant supply module 100 configured as described above, since the first and second water pumps 120 and 130 and the valve device are mounted on the main body 110 and the controller 150 is directly mounted on the main body 110, a separate connection pipe and connection wiring may be minimized.

In addition, the use of a mounting bracket for mounting the reservoir tank 102 and the main body 110 on the vehicle body may be minimized.

In addition, an operator may stably fasten the coolant supply module 100 with the reservoir tank 102 assembled therein to the vehicle.

As described above, the coolant supply module 100 according to an exemplary embodiment of the present disclosure may smoothly supply a coolant to the electric component cooling circuit that circulates the coolant in the drive motors respectively provided to correspond to the front and rear wheels of the vehicle by controlling operations of the first and second water pumps 120 and 130 and the valve device.

Accordingly, when the coolant supply module 100 according to an exemplary embodiment of the present disclosure configured as described above is applied, a coolant may be smoothly supplied from one reservoir tank to an electric component cooling circuit for cooling drive motors respectively provided to correspond to the front and rear wheels of a vehicle and a pipe connection is facilitated, and thus, the space utilization in a narrow space may be improved.

In addition, in the present disclosure, since the first and second water pumps 120 and 130 for supplying a coolant to an electric component cooling circuit provided for cooling each drive motor, the reservoir tank 102, and the controller 150 are integrally connected, the overall number of components may be reduced and packaging may be promoted.

In addition, in the present disclosure, a layout of connection lines and connection pipes may be simplified and mountability and maintainability may be improved.

Furthermore, in the present disclosure, the use of separate components for connecting respective pipes may be minimized, thereby promoting weight and cost reduction and reducing the assembly process to improve productivity.

As described above, while the present disclosure has been described with reference to limited embodiments and drawings, it is to be understood that the present disclosure is not limited thereto and various changes and modifications may be made by those skilled in the art, without departing from the scope of the appended claims.

What is claimed is:

1. A coolant supply module comprising:
    a reservoir tank configured to store a coolant;
    a main body connected to the reservoir tank and configured to allow the coolant stored in the reservoir tank to flow;
    at least one pump mounting portion formed in the main body and mounted to the at least one water pump;
    a valve mounting portion formed in the main body between the at least one pump mounting portion and mounted to a valve device; and
    a controller mounted in the main body and electrically connected to the at least one water pump;
    wherein the main body includes a branch portion configured to allow a portion of the coolant introduced into one of the at least one pump mounting portion to flow into another pump mounting portion.

2. The coolant supply module of claim 1, wherein the main body further includes a tank connection portion communicating with an inside of the valve mounting portion, the reservoir tank being mounted on the tank connection portion.

3. The coolant supply module of claim 2, wherein a connection hole is formed below the reservoir tank, the connection hole corresponding to the tank connection portion.

4. The coolant supply module of claim 1, wherein the at least one pump mounting portion includes:
    a first pump mounting portion formed on one side of the main body; and
    a second pump mounting portion formed on an other side of the main body corresponding to the first pump mounting portion and configured to communicate with the branch portion.

5. The coolant supply module of claim 4, wherein a first water pump having a first port is mounted on the first pump mounting portion.

6. The coolant supply module of claim 5, wherein a branch port configured to be mounted on the branch portion is formed at the first port.

7. The coolant supply module of claim 6, wherein the branch portion has one end integrally connected to the second pump mounting portion and an other end positioned spaced apart from the first pump mounting portion to correspond to the branch port so that the branch port is mounted.

8. The coolant supply module of claim 4, wherein a second water pump having a second port is mounted on the second pump mounting portion.

9. The coolant supply module of claim 4, wherein the first pump mounting portion is positioned facing the second pump mounting portion, and the first pump mounting portion and the second pump mounting portion are positioned on a same line on both sides of the main body.

10. The coolant supply module of claim 1, wherein the controller includes a connection connector formed in a position corresponding to the at least one water pump and connected to the at least one water pump.

11. The coolant supply module of claim 10, wherein the connection connector is bent from the controller toward the at least one pump mounting portion.

12. The coolant supply module of claim 1, wherein at least one cooling fan is mounted on the controller to prevent the controller from being overheated.

13. The coolant supply module of claim 1, wherein a connector connection portion is formed in the controller and configured to apply a control signal.

14. The coolant supply module of claim 1, wherein the main body further includes a bypass port communicating with the valve mounting portion.

* * * * *